United States Patent [19]

Haschke et al.

[11] 3,896,086
[45] July 22, 1975

[54] PROCESS FOR THE PREPARATION OF BIODEGRADABLE POLYCARBOXYLATES

[75] Inventors: Heinz Haschke; Gerhard Morlock, both of Grossauheim; Wilfried Felber, Grosswelzheim, all of Germany

[73] Assignee: Deutsche Gold- und Silber-Scheideanstalt vormals Roessler, Frankfurt, Germany

[22] Filed: June 5, 1974

[21] Appl. No.: 476,633

[30] Foreign Application Priority Data
June 14, 1973 Germany............................ 2330260

[52] U.S. Cl. .... 260/67 UA; 252/DIG. 2; 260/530 R; 260/DIG. 43

[51] Int. Cl.² .......................................... C08F 16/34
[58] Field of Search ............................... 260/67 UA

[56] References Cited
UNITED STATES PATENTS

| | | | |
|---|---|---|---|
| 3,141,864 | 7/1964 | Rink................................ | 260/67 UA |
| 3,686,145 | 8/1972 | Haschke et al. ................ | 260/67 UA |

*Primary Examiner*—Lucille M. Phynes

[57] ABSTRACT

Acrolein together with acrylic acid as an optional reactant is polymerized in a heated, moving aqueous hydrogen peroxide solution by gradually adding monomers and n-dodecyl mercaptan to the solution. The resultant polymer exhibits improved biological degradability making it especially useful in detergents.

37 Claims, No Drawings

PROCESS FOR THE PREPARATION OF BIODEGRADABLE POLYCARBOXYLATES

The invention relates to a method of preparing polymers of acrolein alone or together with acrylic acid in a heated, moving aqueous hydrogen peroxide solution and in the presence of n-dodecyl mercaptan.

It is known in the art that acrolein by itself or together with acrylic acid can be oxidatively polymerized in such a way that the monomer or mixture of monomers is added in doses to a heated, moving, aqueous solution of hydrogen peroxide (German published application No. 1,942,556). 1,942,556). The poly-(aldehydrocarboxylic acids) obtained thereby in the form of an aqueous solution can optionally be neutralized with alkali metal hydroxides and/or evaporated to dryness.

It is also known in the art that poly-(aldehydro carboxylates) can be reacted with alkali metal hydroxides according to Cannizzaro, whereby the corresponding poly-(hydroxycarboxylates) are formed (German published application No. 1,904,940).

The poly-(aldehydrocarboxylates), called "PAC" for short, and the poly-(hydroxy carboxylates) called "POC" for short, as well as the poly-(hydroxy aldehydo carboxylates), called PAC or POC depending on the predominant character, developing intermediarily during Cannizzaro reaction, are suitable as complexing agents for metal ions [cf. H. Haschke in *Mh. Chem.* 103, No. 2, 525 (1972)] and as builders in the formulation of solid or liquid detergents and cleaners with partial or complete substitution of the phosphates. Phosphates have been used hitherto mainly for this purpose, especially pentasodium tri-phosphate [cf. German published application No. 1,962,125; German published application No. 2,025,238; German published application No. 2,044,601; *Chemiker Ztg.* 96, No. 4, (1972)].

These compounds offer the possibility of an active contribution to the protection of the environment, because due to their freedom from phosphorus and nitrogen and their technical suitability as builders, and in case of their use as phosphate substitutes or as substitutes for recently partly used builders on an amino polycarboxylate basis, such as nitrilo tri-acetate ("NTA"), they help to decrease the danger or the problems of eutrophication of natural or "artificial" (f. ex., dammed up) lakes, standing or only slow-flowing surface waters.

It is known that generally only about one-third of the quantities of phosphates contained in the tributaries of surface waters and responsible for eutrophization phenomena in said surface waters, originate from detergents and cleaners. The remaining two-thirds are divided fairly evenly among phosphates from human metabolism and phosphates in soil erosion from agricultural areas. Even a complete elimination of phosphates from the detergents and cleaning agents would, therefore, not convert eutrophic waters to an oligotrophic condition, since even then sufficient phosphate would still be fed in from the remaining sources of phosphates to generally maintain the eutrophic condition or the danger of eutrophization. Nevertheless, any quantity of phosphate brought into eutrophic surface waters or surface waters subject to the dangers of eutrophization can result in an ecologically highly negative effect: to whit, the phosphate is greatly enriched in (some varieties of) algae, so that the algae, after they die off, and after having sunk to the bottom of the waters as mud, there act as a "phosphate fertilizer."

On the one hand, this algae-mud "cements" the bottom of the waters, and thus disturbs the life habits of the waterfauna; or this mud can plug up the gills of fish, and thus lead to mass destruction of fishes. On the other hand, this algae-mud needs oxygen for its (aerobic) biological degradation In eutrophic waters in which the growth of algae becomes rampant because of "excess phosphate fertilizing," so much algae-mud can be present that the concentration of oxygen decreases greatly and anaerobic conditions can occur in the layers of waters at the bottom — and in waters exhibiting less movement, even progressively in higher layers of water. Thus, for example, the spawn of fish on the bottom is killed or the anaerobic decomposition of the mud can lead to the liberation of ammonia and hydrogen sulfide — quite apart from the fact that the overabundant growth of algae impedes the incidence of light even in the highest layers of the waters, and thus, too leads to the dying of the aquatic fauna.

All these phenomena are known as the negative consequences of eutrophization. As a result of a continuous input of phosphate into eutrophic waters or into waters endangered by eutrophization, this condition is stabilized even further — even for the future — with each ounce of phosphate reaching the waters because of the phosphate storage action of the algae. Because of the "phosphate storage fertilizer-effect" of the algae mud, some of the Bavarian lakes, for example, are so lastingly eutrophied even today, that even in case of immediate cessation of any kind of phosphate input, up to decades of regeneration periods would be required until the oligotropic condition would be restored.

In order to control the eutrophization problem, it would be highly desirable to keep away as much as possible any — even the smallest quantity — of phosphate from surface waters. It would also be desirable to create suitable possibilities for sewage treatment (f. ex., chemical precipitation of phosphate requires time, while the eutrophization problems continue to grow, and which under actual conditions does not always function absolutely reliably or sufficiently). Reducing phosphate in detergents and cleaning agents or substituting for phosphates are typical measures among others.

Naturally, a suitable phosphate substitute must exhibit excellent washing and toxicological characteristics, but also it must necessarily be unobjectionable ecologically. Thus, the behaviour of the substitute vis a vis heavy metal minerals among others or its behaviour in case of the customary sewage clarifying processes is significant on the one hand, but on the other hand, its biological degradation is also significant. While the suitability of the mentioned POC or PAC compounds as detergents has been proven, and these substances are also unobjectionable as builders from a toxicological point of view, and a certain biological degradation of the PAC or POC compounds produced according to the known processes does indeed exist, but (in dependence on certain PAC- or POC-types) it is at best just high enough to be designated as "barely sufficient" according to the yardsticks applied at present for anionic tensides. For example, a poly-(hydroxy carboxylic acid) - sodium salt produced by oxidative copolymerization of acrolein with acrylic acid and subsequent Cannizzaro reaction, and having a medium degree of polymerization of 20 and a COO$^-$-: OH group numerical ratio (including the terminal groups) of 4 in the "closed bottle test" according to W. K. Fischer ("GF test") [Fette-Seifen - Anstrichmittel 65, No. 1, 37 (1963)] has a decomposition value of 30–40% after 30 days of testing. According to W. K. Fischer [Tenside Detergents 8, No. 4, 182 (1971)] this is still barely graded as "sufficiently" biologically degradable. The same results are obtained in the GF-test with the corresponding poly-(aldehydro carboxylate). By "corresponding" we understand here that the mentioned poly-(hydroxy carboxylate) develops from said poly-(aldehydocarboxylate).

Thus, there exists a need in the art for a process for preparing polycarboxylates having suitable cleaning and toxicological characteristics making them useful in detergents and cleaners, and yet exhibiting improved biological degradability when compared with at least some similar, known polymers.

Accordingly, this invention provides an improved method for the preparation of polycarboxylates which exhibit improved biological degradability. Acrolein is oxidatively polymerized as the sole monomer or together with acrylic acid as a comonomer. The monomer or mixture of monomers is slowly added to a heated, moving, aqueous hydrogen peroxide solution. Subsequent reaction or neutralization according to Cannizzaro can optionally be employed. The improvement provided by this invention involves the presence of n-dodecyl mercaptan during the polymerization reaction. About 0.1 to about 10% by weight, based on the weight of the monomer or monomer mixture, is slowly added to the peroxide solution.

The process according to the invention can be used by itself for polymerization of acrolein, or else for copolymerization of acrolein with up to about 50 mole %, preferably up to about 35 mole %, especially with about 10 to about 30 mole % of acrylic acid. The monomer or mixture of monomers is added to a moving, for example stirred, aqueous, hydrogen peroxide solution of about 10 to about 35% by weight, preferably about 15 to about 25% by weight, and heated to a temperature of about 50° to about 100°C, preferably of about 55° to about 85°C, in such a quantity that there will be about 1.0 to about 1.2 moles acrolein per 1 mole of given $H_2O_2$. The addition of the monomer or mixture of monomers to the $H_2O_2$ takes place within a time of up to about 7 hours, preferably about 2 to about 7 hours, especially about 3 to about 5 hours.

The n-dodecyl mercaptan which is also employed in the process of this invention, is used in a quantity of 0.1 to 10.0% by weight, preferably about 0.5 to about 5.0% by weight, especially about 0.5 to about 2.0% by weight, related to the weight of the monomer or mixture of monomers used.

The poly-(aldehydo carboxylic acids) formed during polymerization, their salts obtainable by neutralization with alkali metal hydroxides, or the poly-(hydroxycarboxylates) produced from them by Cannizzaro reaction in aqueous solution are considerably more easily biodegradable than all analogous PAC's or POC's producible according to known processes, i.e., developing from the same, relative molar proportions of acrolein, acrylic acid and $H_2O_2$ with the same concentrations of reactants.

The addition of the n-dodecyl mercaptan can be accomplished in such a way that it will start and be finished simultaneously with the addition of the monomer or mixture of monomers. It is, however, particularly beneficial if the addition of mercaptan takes place toward the end of the reaction of the one or several monomers with the (remaining) hydrogen peroxide. On the other hand, if the mercaptan is added at the beginning of the reaction of the one or several monomers with hydrogen peroxide, n-dodecyl mercaptan is apparently oxidized in a considerable proportion to substances exhibiting strong tenside effects, presumably n-dodecylsulfonate. The reaction mixture then has a particularly strong tendency for foaming, and consequently is difficult to handle technically.

It therefore is advantageous to conduct the process of the invention in such a way that the addition of the monomer or mixture of monomers takes place within about 3 to about 5 hours, and the addition of n-dodecyl mercaptan only begins about 0.1 to about 2.0 hours, preferably about 0.5 to about 1.5 hours after the beginning of the addition of the monomer(s). The addition of the n-dodecyl mercaptan can then be completed with the addition of monomer(s) or up to about 3 hours, preferably about 0.5 to about 1.5 hours, after the completion of the addition of the monomer or mixture of monomers.

At the same time the rate of addition of the n-dodecyl mercaptan, expressed in percent of the total quantity of mercaptan to be added per hour, can be varied during the course of the addition to between about 1 and about 40% per hour. It will be effective to start at about 1 to about 10% per hour, especially at about 1 to about 5% per hour, and to gradually increase the rate of addition so that after the third hour after the beginning of the addition of the monomer(s) still no more than about 30% of the quantity of mercaptan that is to be added will have been added, and yet the rate will be such that 100% addition of mercaptan can be achieved within the time provided.

The monomer or monomer mixture employed can contain up to about 500 ppm of stabilizers (against spontaneous radical polymerization), such as hydroquinone or hydroquinone ether (for example, hydroquinone monomethyl ether).

If in the course of the polymerization reaction, foaming of the reaction mixture is too great, then that can be countered by the addition of small quantities of a commercial defoaming agent having a silicone base, or by addition of lower alcohols, such as methanol, ethanol, propanol, isopropyl alcohol, and/or butanol.

It is recommended toward the end of the addition of the monomer (mixture), i.e., after about 80% of the monomer (mixture) has been added, to dilute it by addition of water so much, that one finally will obtain about 20 to about 40% by weight, preferably about 25 to about 40% by weight, poly-(aldehydo carboxylic acid) solution. As a result, the solution remains more easily stirrable, or any possibly occurring branching reactions are suppressed still further. Such branching reactions would have a negative influence on the degradability of the products.

For the production of the alkali metal salts of the poly-(aldehydo carboxylic acids) obtained by the process of this invention, the aqueous poly-(aldehydo carboxylic acids) obtained according to the process can be neutralized directly with alkali metal hydroxides. At the same time one must be careful that the neutralization is accomplished so cautiously (working in a sufficiently dilute solution, or with sufficiently dilute alkali metal hydroxide solutions, or sufficiently slow addition of alkali metal hydroxide with sufficiently good intermixing), that no aldol condensations will develop on the poly-(aldehydo carboxylates) through a local excess concentration of alkali metal. Otherwise, inter- or intramolecular cross linkages would occur which would have an extremely unfavorable effect on the biological degradability of these compounds. The same is true for the production of the corresponding poly-(hydroxycarboxylates) by the Cannizzaro reaction on the poly-(aldehydo carboxylates) in the presence of alkali metal hydroxides. The Cannizzaro reaction can also be carried out in the presence of formaldehyde. In that case, one will get besides the Cannizzaro reaction, a formaldehyde-condensation on the poly-(aldehydo carboxylates) by way of the H-atoms being in alpha position in regard to the carbonyl groups. Carrying out of the Cannizzaro reaction, even in the presence of formaldehyde, on polyaldehydic compounds or on such poly-(aldehydo carboxylates) has already been described by R. C. Schulz et al. Natural Sciences 45 (1958) 440; Applied Chemistry 76, No: 9, (1964) 357; Makromol. Chem. 76 (1963) 187, by G. Bier et al.; Makromol. Chem. 92 (1966) 240 and by H. Haschke Mh. Chem. 103 (1972) 525. Logically, the neutralization of the poly-(aldehydo carboxylic acids) to poly-(aldehydo carboxylates) must accordingly also be carried out just as "carefully."

After completion of the addition of the monomers, it will be well to keep the reaction mixture for a few hours — effectively initially still while stirring — at temperatures between about 40° and about 90°C, preferably between about 50° and about 75°C, in order to achieve the fullest possible conversion of the monomers. After a "secondary reaction time" — i.e., the time after completion of the addition of the monomers — of about 12 hours, a 90 to 99% monomer-conversion will have been achieved. The remaining monomers can be largely removed from the reaction mixture in the customary manner (for example, by distillation or by way of film evaporators), preferably under decreased pressure by distilling off about 10 to about 40% of the volume of the reaction mixture.

The poly-(aldehydo carboxylic acids) that can be produced according to the process of this invention can be described as linear polymers or oligomers, built up from units of the formulas:

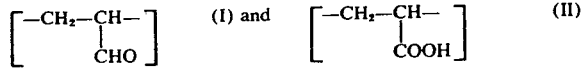

beside slight (i.e., about 0–20 basic mole %) quantities of units of the formula:

The units of the formula (III) develop, since even under radical reaction conditions — as in case of the process of this invention — one must never exclude the possibility that acrolein — C—O polymerisates are also formed besides the preferably occurring acrolein — C—C polymerisation — to be sure to a far lesser extent. These units, however, also exert a certain, even if much inferior, positive influence on the biological degradation of the polymers. This corresponds to the known fact that a polyether is much more easily biodegradable than polymers with pure C—C chains (for example, polyethylene oxides as compared to polyethylene). This occurrence, among others, is responsible for the fact, that poly-(aldehydo carboxylates) and poly-(hydroxy carboxylates), which were produced from poly-(aldehydo carboxylic acids), which were obtained according to the process of the oxidative homopolymerization of acrolein or the process of the oxidative copolymerization of acrolein and acrylic acid according to K. H. Rink (German patent No. 1,071,339) and according to H. Haschke [Mh. Chem. 103, No. 2 (1972) 525] are that much more biodegradable per se than all comparable polyelectrolytes that can be produced according to other processes. Nevertheless, there are also limits to this effect, because, for one thing, the portion of units of the formula (III) in the PAC's produced cannot be increased arbitrarily in the case of the oxidative polymerization or copolymerization of acrolein (the limit is at about 20 basic mole %), and for another thing, an increase of the portion of units of formula (III) to beyond 2–4 basic mole % practically does not bring about any substantial positive contribution to the biological degradability of the PAC's.

The addition of n-dodecyl mercaptan during the oxidative acrolein polymerization or copolymerization according to the process of this invention practically does not change the proportion of units of formula (III) in the PAC's produced. Nevertheless, addition of the mercaptan surprisingly improves the biological degradability of the compound produced from the area of "not sufficient" to "just about sufficient" to the area of "sufficient" to "good" biological degradability. This result is probably because of a surprising influence by the mercaptan on the growth of the molecules in the course of the oxidative polymerization or copolymerization, which is particularly favorable for biological degradation.

For the characterization of the poly-(aldehydo carboxylic acids) obtained in the process of this invention, a mean degree of polymerization, related to the number of the hypothetical formula units:

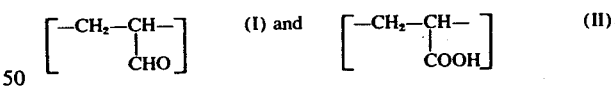

was determined in the poly-(aldehydo carboxylic acids) viscosimetrically, as by R. C. Schulz, H. Cherdron and W. Kern, Makromol. Chem. 24, 151 (1957). For this test the reduced viscosity (specific viscosity /c) was determined in deciliters per gram of 1% poly-(aldehydo carboxylic acid) solution.

For the preparation of the 1% poly-(aldehydo carboxylic acid) solutions, corresponding quantities of 5% aqueous $SO_2$ - solutions are first poured over the free poly-(aldehydo carboxylic acids) produced in the form of dry powders, by evaporation of the water, optionally after destruction of possibly existing residual peroxide, from the poly-(aldehydo carboxylic acid) solutions, and then, after complete solution has occurred, filled up with an equal volume of 10% aqueous NaCl solution. The viscosimetric measurement takes place at 20°C.

A continuous curve-path of the points:

| $\bar{P}$ | 2 | 3 | 4 | 5 | 6 | 7 | 8 | 9 | 10 |
|---|---|---|---|---|---|---|---|---|---|
| $\eta_{red}$ | 0.016 | 0.024 | 0.028 | 0.033 | 0.038 | 0.040 | 0.043 | 0.045 | 0.047 |
| $\bar{P}$ | 20 | 30 | 50 | 70 | 100 | | 300 | | 500 |
| $\eta_{red}$ | 0.060 | 0.065 | 0.073 | 0.080 | 0.095 | | 0.20 | | 0.30 | plotted by means of vapor pressure-osmometric methods with poly-(aldehydocarboxylic acid) - methyl esters was made the base of a calibration curve. The poly-(aldehydo carboxylic acid) - methyl esters needed for the plotting of the calibration curve were produced by methylation of pure powdery poly-(aldehydo carboxylic acids), with which values of the reduced viscosity in 1% $SO_2$ - NaCl solutions had already been measured according to Schulz's method, with diazomethane in benzene according to A. Katchalski and H. Eisenberg [J. Polym. Sci. 6, No. 2 (1951) 145].

Moreover, the content of carbonyl groups were determined with the powdery, dry poly-(aldehydo carboxylic acids) according to the oximation reaction with hydroxylamine hydrochloride of R. C. Schulz, H. Fauth and W. Kern [Makromol Chem. 20 (1956) 161]. The determination of the carboxyl contents of the poly-(aldehydo carboxylic acids) took place by simple alkali-acidimetric titration, i.e. titration of poly-(aldehydo carboxylic acid) suspension with 0.1 n NaOH against phenolphthalein up to the first rose hue; then addition of an excess of 5 ml 0.1 n NaOH and immediate retitration with 0.1 n HCl.

The carbonyl or carboxyl contents of the poly-(aldehydo carboxylic acids) were given in the form of basic mole % ("base mole %") according to E. Trommsdorff [Inaug. Dissertation Freiburg i. Br. 1931]. For this purpose and as a gram-molecular weight $M_2$ of a mean formula unit

— therefore of a mean $C_2$ - unit in the molecular chain
— the value $M_2 = 56.x + 72.y$, was made the base, whereby y = basic mole % COOH/100 and $X = 1-y$.

The poly-(aldehydo carboxylic acids) obtained first according to the process of this invention can be reacted in aqueous solution or suspension with a strong base, optionally in the presence of formaldehyde. In the latter case, one can proceed by adding the formaldehyde in about stoichiometric quantities relative to the aldehydic groups present in the polymers, and by stirring it for some time at ambient temperature or at elevated temperatures up to about 100°C, preferably about 20° to about 60°C, especially about 20° to about 45°C with gradual addition of alkali. After two hours, the conversion can amount, for example, already to 60 to 70% of the theoretically complete conversion, and within 8–24 hours it can rise to 90 to 100% of the theoretically complete conversion. In case of conversion into solution, one will obtain solutions which, beside the salts of the poly-(hydroxy aldehydo carboxylic acids) or poly-(hydroxy carboxylic acids) contain an excess of alkali (base). They can be evaporated to dryness. By precipitation from the reaction mixture, for example, with methanol, the salts will be obtained in a particularly pure form. But it is also possible to neutralize the solution prior to evaporation with a dilute acid for example, hydrochloric acid or preferably formic acid, sulphuric acid or phosphoric acid, or to precipitate the free acids.

The neutralization of the excess of alkali can take place effectively only with such acids, the salts of which cause no trouble during use of the polymers. For this, carbon dioxide, hydrochloric acid, sulphuric acid, phosphoric acid, formic acid or acetic acid, can, for example, be employed. But it is advantageous to use for this purpose the poly-(hydroxy aldehydo carboxylic acids) or poly-(hydroxy carboxylic acids) themselves in a pure solid form or in solution, or according to a particularly preferred variation, the poly-(aldehydo carboxylic acids) obtained as an intermediate product in case of the above mentioned production reaction, in aqueous solution or in solid form. In this way one will obtain neutral solutions of the salts of the poly-(hydroxy aldehydo carboxylic acids) or poly-(hydroxy carboxylic acids), which can be used directly. In the main chain they have predominantly C—C bonds. The polymers contain in any case units (II a) and (IV), as well as possibly units (I) and/or (III).

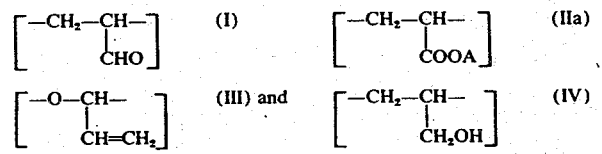

These units are developed partly during the treatment of the poly-(aldehydo carboxylic acids) according to the Cannizzaro reaction.

whenever the conversion of the poly-(aldehydo carboxylates) is carried out with strong bases according to Cannizzaro in the presence of formaldehyde, then additionally units of the general formulas (V) and (VI) will develop.

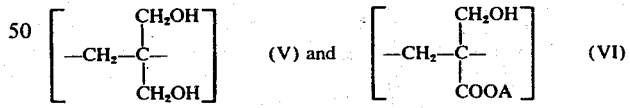

Although the oxidative polymerization or copolymerization of acrolein is a radical polymerization, nevertheless units of the general formula (III) can be present in subordinate quantities up to about 20 basic mole % in the main chains of the poly-(aldehydo carboxylates) and also of the poly-(hydroxy aldehydo carboxylates) or poly-(hydroxy carboxylates) produced from them by Cannizzaro reaction. They develop through polymerization with opening of the carbonyl double bond of the acrolein.

In the formulas for units (IIa) and (VI), A stands for at least one member selected from the group alkali metal, hydrogen and ammonium, preferably for an alkali metal or hydrogen.

Since the PAC's or the POC's obtainable from these by Cannizzaro reaction in the form of free acids, are very weak acids, the aqueous solutions of their salts have pH values lying more or less strongly in the alkaline area. Beyond that, these substances as electrolytes show the peculiarity that in an aqueous solution they will not practically dissociate into their ions in case of all concentrations ["primary dissociation" - J. Am. Chem. Soc. 72 (1950), 2636], in contrast to the classical, simple electrolytes. Consequently, in case of dilution of such polyelectrolyte- salt solutions, first of all the effect of the primary dissociation predominates, as a result of which additional carboxylate groups become free which, as anion bases in the hydrolysis equilibrium leads to a rise in pH, and leads to a drop of the pH only after complete primary dissociation corresponding to the behaviour of classical, simple electrolytes, according to (Oswald's) law of dilution.

The corresponding partial salts of the poly-(aldehydocarboxylic acids), poly-(hydroxy aldehydo carboxylic acids) or poly-(hydroxy carboxylic acids), therefore the compounds representing so-called "hydrogen salts," can likewise be used advantageously, for example, as builders for detergents and cleaning agents.

Naturally it is effective for the determination of the biological decomposition of such compounds, to use salts which would shift the pH of the decomposition solution (it lies generally at about pH = 7) as little as possible, in case of the desired probe-substratum concentration.

This invention will be more fully understood by reference to the following examples in which all parts, proportions, percentages and ratios are by weight unless otherwise indicated.

EXAMPLE 1

To a 4 l three-necked flask with mechanical paddle stirrer, reflux cooler, automatic temperature control by way of a resistance thermometer and a drop-in measuring device taking 100 ml, attached by way of a Claisen attachment beside the entry port for the thermometer, a mixture of 780 ml distilled water and 900 ml of 35% by weight hydrogen peroxide are added. In a water bath controlled by thermostat at 60°C, the mixture produced in this way is heated to 55°C with 21% by weight $H_2O_2$ while stirring. Then the addition of a mixture of 780 ml of freshly distilled acrolein and 198 ml of stabilized (with 500 ppm hydroquinone monomethyl ether) acrylic acid (corresponding to 20 mole % acrylic acid in the monomer mixture) is started with an addition rate of about 245 ml per hour. Thus, the total 978 ml of monomer mixture are added within about 4 hours. One hour after the start of the addition of monomers, addition of n-dodecyl mercaptan to the reaction mixture is started, at first at a rate of 3% of the entire quantity of mercaptan to be added (i.e., 8.65 g = 10.25 ml) per hour. The rate of addition of mercaptan is increased gradually: 2 hours after the addition of monomers it amounted to 7% of the entire quantity of mercaptan to be added per hour, 3 hours after the start of adding the monomers 10% per hour, 4 hours after the start of adding the monomers, 23%/hr and 5 hours after the start of adding the monomers, 37%/hr. Six hours after the start of adding monomers, 100% of the n-dodecyl mercaptan had been added.

The thermostat-controlled water bath is kept at 60°C during the entire reaction; the temperature of the reaction mixture rose in the course of the reaction to a maximum of 75°C.

After 910 ml of monomer mixture had been added, it is diluted with 63 ml of distilled water; likewise, after 940 ml of monomer mixture had been added and finally once more after completion of monomer addition. After completion of addition of mercaptan, stirring continues for 1 more hour in the water bath controlled by thermostat at 60°C, then the heating of the water bath is turned off and the preparation is left to stand for 14 hours.

After that, 20% by volume of the preparation is distilled off in a water jet vacuum, after addition of 300 ml n-propanol. The residue represented an about 35% by weight aqueous solution of a poly-(aldehydo carboxylic acid) with mediun degree median polymerization 17 (eta red = 0.058 dl/g), a carbonyl content of 27.0 basic mole % and a carboxyl content of 75.5 basic mole %. [The remaining 2.5 basic mole% corresponds to vinyl groups from the units of the formula (III)].

Testing the Capability for Biological Degradation a. With poly-(aldehydo carboxylate)

820 ml of the above mentioned poly-(aldehydo carboxylic acid) solution are added to a 4 l three-necked flask. 190 ml of 45% by weight caustic soda solution (aqueous liquor) are added in doses within 2 hours, while stirring and slight cooling of the reaction mixture (water bath). The pH of the reaction mixture is controlled continuously in the course of neutralization. As soon as the reaction mixture reaches a pH value of 7.0, the dosing in of liquor is stopped. The poly(aldehydo carboxylate) solution obtained is evaporated to dryness, the residue is ground, and finally dried for 3 hours at 120°C in a water jet vacuum (12 mm) as a powder. The pure poly-(aldehydo carboxylate) obtained is used for the determination of the biological degradability in the G.F. test according to W. K. Fischer. The BSBT-value (= theoretical bio-chemical oxygen requirement for complete biological oxidation, expressed in mg $O_2$ per 100 mg substratum) of the poly-(aldehydocarboxylate) amounted to: 126.4.

In case of a substratum concentration of 2 ppm, an oxygen consumption of 1.27 ppm was measured with it in the G.F. test (starting out from air-saturated water and at an innoculation with about 500 germs per $cm^3$ from filtered biological sludge suspension from a community sewage plant) after 30 experimental days, which corresponds to a biological rate of degradation under G.F. - test conditions of 50%.

b. With poly-(hydroxy carboxylate)

810 ml of the above mentioned poly-(aldehydo carboxylic acid) - solution are added to a 4 l three-necked flask. Within 2 hours, 190 ml of 45% by weight caustic soda solution (aqueous liquor) are added in doses, while stirring and slight cooling of the reaction mixture (water bath). The pH of the reaction mixture is continuously controlled electrometrically in the course of the neutralization. After dosing in of this first NaOH charge, the reaction mixture has a pH value of 7.0. Within 4 hours, another 40 ml of 45% by weight NaOH is added, as a result of which the pH of the reaction mixture is raised to 12. This pH is maintained for 3 hours by continuous restoration of the caustic soda solution used up by ongoing Cannizzaro reaction. Altogether, 298 ml of 45% by weight NaOH are consumed. Subsequently, the neutralization takes place with a residue of as yet unused poly-(aldehydo carboxylic acid) solution from the same polymerization preparation, to pH = 7 consuming 25 ml of this acid solution. The poly-(hydroxy carboxylate) solution obtained is evaporated to dryness, the residue is ground and final-dryed once more as a powder at 120°C for 3 hours in a water jet vacuum (10 mm Hg).

The poly-(hydroxy carboxylate) thus obtained is used in the G.F. test according to W. K. Fischer for the determination of its biological degradability. The BSBT-value (expressed in mg $O_2$ per 100 mg substratum) of the poly-(hydroxy carboxylate) amounted to: 117.1.

In the case of a concentration of the substratum of 2 ppm (starting out from air-saturated water and with an innoculation with about 500 germs/cm$^3$ from the filtered activated sludge suspension from a community sewage plant) an oxygen consumption of 1.1 ppm was measured in the G.F. test after 30 experimental days, which corresponds to a biological degradation of 47% under G.F. test conditions.

Comparative Experiment

For the sake of comparison, Example 1 is repeated but the addition of n-dodecyl mercaptan, according to this invention is omitted:

780 ml of distilled water and 900 ml of 35% by weight hydrogen peroxide are added to a 4 l three-necked flask with mechanical paddle stirrer, reflux cooler, automatic temperature control by way of a resistance thermometer and a drop-in measuring device taking 100 ml, connected by way of a Claisen attachment beside the entry port for the thermometer. The preparation produced in this way was heated with 21% by weight $H_2O_2$ while stirring, to 55°C in a water bath controlled by thermostat at 60°C. Then the addition of a mixture of 780 ml of freshly distilled acrolein and 198 ml of stabilized (with 500 ppm hydroquinone monomethyl ether) acrylic acid at an addition rate of about 245 ml per hour is started. Altogether, the 978 ml monomer mixture was thus added within about 4 hours. The thermostat controlled water bath is maintained at 60°C during the entire reaction; the temperature of the reaction mixture rose to a maximum of 75° C in the course of the reaction.

After 910 ml of monomer mixture had been added, it is diluted with 63 ml of distilled water; likewise after the addition of 940 ml monomer mixture and finally once more after completion of the addition of monomer. Stirring is continued in the water bath after completion of the dosing in of monomer, thermostat-controlled at 60°C, for another 3 hours, then the heating for the water bath is turned off and the preparation is left to itself for 14 hours.

After that, 20 volume % of the preparation is distilled off in a water jet vacuum after the addition of 300 ml n-propanol. The residue represented an about 35% by weight aqueous solution of a poly-(aldehydo carboxylic acid) with medium polymerization degree of 20 (eta red = 0.06 dl/g), a carbonyl content of 26 basic mole % and a carboxyl content of 71.5 basic mole %. [The remaining 2.5 basic mole % corresponds to vinyl groups from the units of formula (III)].

Testing of the Biological Degradability a. With poly-(aldehydo carboxylate)

820 ml of the above mentioned poly-(aldehydo carboxylic acid) are added to a 4 l three-necked flask. Within 2 hours 200 ml of 45% by weight caustic soda solution (aqueous solution) are dosed in while stirring and slightly cooling the reaction mixture (water bath). The pH of the reaction mixture is continuously controlled electrometrically in the course of the neutralization. As soon as the reaction mixture has achieved a pH value of 7.0, the dosing in of the liquor is stopped. The poly-(aldehydo carboxylate) solution obtained is evaporated to dryness, the residue is ground and final dryed once more as a powder for 3 hours at 120°C in a water jet vacuum (12 mm). The pure poly-(aldehydo carboxylate) thus obtained, is used in the G.F. test according to W. K. Fischer for the determination of its degradability. The BSBT-value (= theoretical bio-chemical oxygen requirement for complete biological oxidation, expressed in mg $O_2$ at 100 mg substratum) of the poly-(aldehydo carboxylate) was: 125.6.

In case of a substance concentration of 2 ppm, an oxygen consumption of 1.08 ppm is measured with it after 30 experimental days in the G.F. test (starting out with air-saturated water and an innoculation with about 500 germs/cm$^3$ from filtered activated sludge suspension from a community sewage plant), which corresponds to a biological degradation rate under G.F. test conditions of 43%.

b. With poly-(hydroxy carboxylate)

820 ml of the above mentioned poly-(aldehydo carboxylic acid) solution are added to a 4 l three-necked flask. Within 2 hours, 200 ml of 45% by weight caustic soda solution (aqueous solution) are dosed in while stirring and cooling the reaction mixture (water bath) slightly. The pH of the reaction mixture is continuously controlled electrometrically in the course of the neutralization. After dosingin of this first NaOh charge, the reaction mixture has a pH value of 7.0. Addition of another 40 ml of 45% by weight NaOh is accomplished within 4 hours, as a result of which the pH of the reaction mixture is raised to 12. This pH is maintained for 3 hours by continuous replacement of the caustic soda solution consumed by the progressing Cannizzaro reaction. Altogether, 300 ml of 45% by weight NaOh are consumed. Subsequently, the neutralization is accomplished with a residue of not yet used poly-(aldehydo carboxylic acid) solution from the polymerization (batch), to ph = 7.0, using up 30 ml of this acid solution.

The poly-(hydroxy caboxylate) solution obtained is evaporated to dryness, the residue is ground and final dried as a powder once more for 3 hours at 120°C in a water jet vacuum (10 mm Hg). The poly-(hydroxy carboxylate) obtained is used in the G.F. test according to W. K. Fischer for determination of the biological degradability. The BSBT value (expressed in mg $O_2$/100 mg substratum) of the poly-(hydroxy carboxylate) is: 116.7.

In case of a concentration of the substratum of 2 ppm, an oxygen consumption of 0.89 ppm is measured with it in the G.F. test after 30 experimental days (starting out with air-saturated water and with an innoculation with about 500 germs per cm$^3$ from filtered activated sludge suspension from a community sewage plant), which corresponds to a biological degradation under G.F. test conditions of 38%.

A comparison of the results obtained in Example 1 and in the comparative experiment shows that poly-(aldehydo carboxylic acids) with very similar mean polymerization degree, cabonyl content and carboxyl content were formed in the polymerization reactions. The biological degradability of the consequent products produced under the same conditions, however, is considerably improved in the case of Example 1. The improvement amounts in the case of poly- (aldehydo carboxylate) to about 16% and in case of poly-(hydroxy carboxylate) even to about 24%. This improvement in degradation is of particularly great significance since it means a shifting of product qualities from the critical classification range (35–40% - limit into the area to be classified as biologically "well degradable".

EXAMPLE 2

A mixture of 450 ml of distilled water and 540 ml 35% by weight hydrogen peroxide are added to a 4 l three-necked flask with a mechanical paddle stirrer, reflux cooler, automatic temperature control by way of a resistance thermometer and a drop in measuring device taking 100 ml, connected by way of a Claisen attachment beside the entry port for the thermometer. The resulting preparation is heated with 21% by weight $H_2O_2$ to 55°C while stirring in a water bath controlled by thermostat at 60°C. Then the addition of a mixture of 454 ml freshly distilled acrolein and 454 ml stabilized (with 500 ppm of hydroquinone monomethyl ether) acrylic acid is started at an addition rate of about 227 ml/hr. Thus, altogether 908 ml of monomer mixture is added within about 4 hours. One hour after the beginning of the addition of monomer, the addition of n-dodecyl mercaptan to the reaction mixture is started; initially at a speed of 2% of the entire quantity of mercaptan that was to be added (that is 8.6g = 10.2 ml) per hour. The rate of addition of mercaptan is increased gradually: 2 hours after starting the addition of monomer, it amounted to 8% of the entire quantity of mercaptan to be added per hour; 3 hours after starting the addition of monomer it was 10%/hr; 4 hours after starting the addition of monomer 22%/hr; 5 hours after starting the addition of monomer 35%/hr; 6 hours after starting the addition of monomer the n-dodecyl mercaptan had been added completely (100%).

The thermostat-controlled water bath is maintained at 60°C during the entire reaction; the temperature of the reaction mixture rises in the course of the reaction to a maximum of 74°C.

After 817 ml monomer mixture has been added, it is diluted with 324 ml distilled water; also, after 855 ml of monomer mixture has been added and finally once more after completion of the addition of monomer. After completion of addition of mercaptan, stirring is still continued for 1 hour in the water bath controlled by thermostat at 60°C, then the heating of the water bath is turned off and the preparation is left to itself for 14 hours.

Then 18 volume % of the preparation, after addition of 200 ml of isopropyl alcohol are distilled off in a water jet vacuum. The redidue represents about 32% by weight aqueous solution of a poly-(aldehydo carboxylic acid) with median degree of polymerization of 75 (eta red = 0.082 dl/g), a carbonyl content of 20 basic mole % and a carboxyl content of 78.6 basic mole %. [The remaining 1.4 basic mole % corresponds to vinyl groups from the units of formula (III)].

Testing of the Biological Degradability a. With poly-(aldehydo carboxylate)

900 ml of the above mentioned poly-(aldehydo carboxylic acid) solution are added to a 4 l three-necked flask. Within 2 hours, 210 ml 45% by weight caustic soda solution (aqueous solution) are added while stirring and cooling the reaction mixture (water bath) slightly. The pH of the reaction mixture is continuously controlled electrometrically in the course of the neutralization. As soon as the reaction mixture reaches a pH value of 7, the addition of the liquor is stopped. The poly-(aldehydo carboxylate) solution obtained is evaporated to dryness, the residue is ground and final dried once more as a powder for 3 hours at 120°C in a water jet vacuum (12 mm). The pure poly-(aldehydo carboxylate) obtained is used in the G.F. test according to W. K. Fischer for the determination of the biological degradability. The BSBT-value ( = theoretical biochemical oxygen requirement for complete biological oxidation expressed in mg $O_2/100$ mg substratum) of the poly-(aldehydo carboxylate) was: 120.6.

In case of a concentration of substance of 2 ppm, an oxygen consumption of 0.96 ppm, is measured with this in the G.F. test after 30 experimental days. (Starting with airsaturated water and with an innoculation with about 500 germs/$cm^3$ from filtered activated sludge suspension from a community sewage plant), which corresponds to a rate of biological degradation under G.F. test conditions of 40%.

b. With poly-(hydroxy carboxylate)

900 ml of the above mentioned poly-(aldehydo carboxylic acid) are added to a 4 l three-necked flask. Within 2 hours, 210 ml of 45% by weight of caustic soda solution (aqueous solution) are added while stirring and cooling the reaction mixture (water bath) slightly. The pH of the reaction mixture is continuously controlled electrometrically in the course of neutralization. After addition of this first NaOh charge, the reaction mixture has a pH of 7.0. Addition of another 60 ml of 45% by weight NaOH takes place within 4 hours, as a result of which, the pH of the reaction mixture is raised to 12.5. This pH is maintained for 3 hours by continuous restoration of the caustic soda solution used up by the progressing Cannizzaro reaction. Altogether 300 ml of 45% by weight NaOH are consumed. Subsequently, neutralization takes place with a residue of the not yet used poly-(aldehydo carboxylic acid) solution from the same polymerization preparation to pH 32 7, using up 138 ml of this acid solution.

The poly-(hydroxy carboxylate) solution obtained is evaporated to dryness, the residue is ground and final dried once more as a powder for 3 hours, at 120°C in a water jet vacuum (20 mm Hg). The poly-(hydroxy carboxylate) obtained is used in the G.F. test according to W. K. Fischer for the determination of the biological degradability. The BSBT-value (expressed in mg $O_2/100$ mg substratum) of the poly-(hydroxycarboxylate) amounted to: 113.5.

In case of a concentration of the substratum of 2 ppm, an oxygen consumption of 0.84 ppm is measured with it after 30 experimental days in the G.F. test (starting with air-saturated water and at an innoculation of 500 germs/$cm^3$ from filtered activated sludge suspension from a community sewage plant), which corresponds to a biological degradation rate under G.F. test conditions of 37%.

EXAMPLE 3

A mixture of 450 ml distilled water and 540 ml 35% by weight hydrogen peroxide are added to a 4 l three-necked flask with mechanical paddle stirrer, reflux cooler, automatic temperature control by way of a resistance thermometer and a drop-in device taking 100 ml, connected beside the introduction of the thermometer by way of a Claisen attachment. The resulting preparation is heated with a 21% by weight $H_2O_2$ solution to 55°C while stirring in a water bath controlled by thermostat at 60°C. Then the addition of a mixture of 454 ml freshly distilled acrolein and 454 ml of stabilized (with 500 ppm hydroquinone monomethyl ether) acrylic acid is started at an addition speed of about 227 ml per hour. Altogether, the 908 ml of monomer mixture are added within about 4 hours.

One hour after beginning of the addition of the monomer, the addition of n-dodecyl mercaptan to the reaction mixture is started, initially at a speed of 2% of the quantity of mercaptan to be added (i.e., 8.6 g = 10.2 ml) per hour. The rate of addition of the mercaptan is gradually increased 2 hours after the start of adding monomer it is 7% of the entire mercaptan quantity to be added per hour, 3 hours after the start of the monomer addition 15%/hour, 4 hours after the start of the monomer addition 40%/hour, 5 hours after the start of the monomer addition the n-dodecyl mercaptan had been added 100%. The thermostat-controlled water bath is maintained at 60°C during the entire reaction; the temperature of the reaction mixture rose in the course of the reaction to a maximum 75°C.

After 817 ml monomer mixture has been added, this was diluted with 324 ml of distilled water; likewise after 855 ml monomer mixture had been added and finally once more after completion of the addition of monomer. After completion of the addition of mercaptan, stirring is continued another 2 hours in the water bath controlled by thermostat at 60°C, then the heating for the water bath is turned off and the prepartion is left to itself for 12 hours.

After that, 15 volume % of the preparation are distilled off in a water jet vacuum after addition of 200 ml n-propanol. The residue represented an about 30% by weight aqueous solution of a poly-(aldehydo carboxylic acid), with median polymerization degree of 90 (eta red = 0.09 dl/g), a carbonyl content of 22.2 basic mole % and a carboxyl content of 76.6 basic mole %. [The remaining 1.2 basic mole % corresponds to vinyl groups from the units of the formula (III)].

Testing of Biological Degradability a. With poly-(aldehydo carboxylate)

940 ml of the above poly-(aldehydo carboxylic acid) solution are added to a 4 l three-necked flask. Within 2 hours, 201 ml of 45% by weight caustic soda solution (aqueous) solution), are added while stirring and slightly cooling the reaction mixture (water bath). The pH of the reaction mixture is continuously controlled electrometrically in the course of the neutralization. As soon as the reaction mixture reaches a pH value of 7, the addition of the liquor is stopped. The poly-(aldehydo carboxylate) solution obtained is evaporated to dryness, the residue is ground and final dried once more as a powder for three hours at 120°C in a water jet vacuum (12 mm). The pure poly-(aldehydo carboxylate) obtained is used in the G.F. test according to W. K. Fischer for the determination of the biodegradability. The BSBT-value (= theoretical bio-chemical oxygen requirement for complete biological oxidation expressed in mg $O_2$/100 mg substratum of the poly-(aldehydo carboxylate) was: 122.

In case of a substance concentration of 2 ppm, an oxygen consumption of 0.93 ppm was measured with it in the G.F test (starting from air-saturated water and at an innoculation with about 500 germs/$cm^3$ from filtered activated sludge suspension from a community sewage plant) after 30 experimental days which corresponds to a biological degradation rate under G.F. test conditions of 38%.

b. With poly-(hydroxy carboxylate)

940 ml of the above poly-(aldehydo carboxylic acid) solution are added to a 4 l three-necked flask. Within 2 hours, 201 ml of 45% by weight caustic soda solution (aqueous solution) are added while stirring and slightly cooling the reaction mixture (water bath). The pH of the reaction mixture is continuously controlled electrometrically in the course of neutralization. After addition of this first NaOH charge, the reaction mixture has a pH of 7.0. Addition of another 60 ml of 45% by weight NaOH takes place within 4 hours, as a result of which the pH of the reaction mixture is raised to 12. This pH is maintained for 3 hours by continuous restoration of the caustic soda solution used up by the progressing Cannizzaro reaction. Altogether, 290 ml of 45% by weight NaOH are consumed. Subsequently, neutralization is accomplished with a residue of poly-(aldehydo carboxylic acid) solution not yet used and from the same polymerization preparation, to a pH = 7, consuming 140 ml of this acid solution.

The poly-(hydroxy carboxylate) solution obtained is evaporated to dryness, the residue is ground and is once more final dried as a powder for 3 hours at 120°C in a water jet vacuum (12 mm Hg). The poly-(hydroxy carboxylate) obtained is used in the G.F. test according to W. K. Fischer for the determination of biological degradability. The BSBT-value (expressed in mg $O_2$/100 mg substratum) of the poly-(hydroxy carboxylate) was: 114.3.

In case of a substratum concentration of 2 ppm, an oxygen consumption of 0.80 ppm is measured with it after 30 experimental days in the G.F. test (starting from air-saturated water and with an innoculation with about 500 germs/$cm^3$ of filtered activated sludge suspension from a community sewage plant), which corresponds to a biodegradation under G.F. test conditons of 35%.

EXAMPLE 4

A mixture of 780 ml distilled water and 900 ml of 35% by weight of hydrogen peroxide are added to a 4 l three-necked flask with mechanical paddle stirrer, reflux cooler, automatic temperature control by way of a resistance thermometer and a drop-in device taking 100 ml, and connected beside the introduction of the thermometer by way of a Claisen attachment. The resulting preparation is heated with 21% by weight $H_2O_2$ to 57°C while stirring in a water bath controlled by thermostat at 60°C. Then the addition of a mixture of 780 ml freshly distilled acrolein and 198 ml distilled acrylic acid is started with an addition rate of about 245 ml/hr. Altogether, 978 ml monomer mixture are added within about 4 hours. Immediately after the start of the dosing-in of the monomer the addition of n-dodecyl mercaptan is started at a uniform rate of 25% of the entire quantity of mercaptan to be added (i.e., 8.6 g = 10.2 ml) per hour. Four hours after the start of the addition of monomer, the n-dodecyl mercaptan had been added 100%.

During the entire reaction, the thermostat-controlled water bath is maintained at 60°C; the temperature of the reaction mixture rises in the course of the reaction to a maximum of 76°C.

After completion of the addition of mercaptan, stirring is continued for another 3 hours in the water bath, thermostat-controlled at 60°C. Then the water bath heating is turned off and the preparation is left to itself for 15 hours.

After that, 25 volume % of the preparation is distilled off in a water jet vacuum after addition of 400 ml isopropyl alcohol. The residue represents an about 40% by weight aqueous solution of a poly-(aldehydo carboxylic acid) with mean polymerization degree of 15 (eta red = 0.052 dl/g), a carbonyl content of 23.5 basic mole % and a carboxyl content of 73.3 basic mole %. [The remaining 3.2 basic mole % corresponds to vinyl groups from the units of formula (III)].

Testing the Biological Degradability.

a. With poly-(aldehydo carboxylate)

400 ml of the above poly-(aldehydo carboxylic acid) are added to a 4 l three-necked flask. Within 2 hours, 110 ml of 45% by weight caustic soda solution (aqueous solution) are added while stirring and cooling the reaction mixture (water bath) slightly. The pH of the reaction mixture is continuously controlled electrometrically in the course of the neutralization. As soon as the reaction mixture reaches a pH value of 7, the addition of liquor is stopped. The poly-(aldehydo carboxylate) solution obtained is evaporated to dryness, the residue is ground and it is final dryed once more as a powder for 3 hours at 120°C in a water jet vacuum (12 mm). The pure poly-(aldehydo carboxylate) obtained is used in the G.F. test according to W. K. Fischer for determination of the biological degradability. The BSBT-value (= theoretical bio-chemical oxygen requirement for complete biological oxidation, expressed in mg $O_2$/100 mg substratum) of the poly-(aldehydo carboxylate) was: 124.4.

In the case of a substance concentration of 2 ppm, an oxygen consumption of 1.29 ppm is measured with this in the G.F. test after 30 experimental days (starting with air-saturated water and at an innoculation with about 500 germs/cm³ of filtered activated sludge suspension from a community sewage plant) which corresponds to a biological degradation rate under GF test conditions of 52%.

b. With poly-(hydroxy carboxylate)

400 ml of the above poly-(aldehydo carboxylic acid) solution are added to a 4 l three-necked flask. Within 2 hours, 110 ml of 45% by weight caustic soda solution (aqueous solution) are added while stirring and slightly cooling the reaction mixture (water bath). The pH of the reaction mixture is continuously controlled electrometrically during the course of neutralization. After dosing in this first NaOH charge, the reaction mixture has a pH of 7.0. Addition of another 36 ml of 45% by weight NaOH is accomplished within 4 hours, as a result of which the pH of the reaction mixture is raised to 12. This pH is maintained for 4 hours by continuous restoration of caustic soda solution used up by the progressing Cannizzaro reaction. Altogether 180 ml of 45% by weight NaOH are consumed. Subsequently, neutralization takes place with a residue of as yet unused poly-(aldehydo carboxylic acid) solution from the same polymerization preparation to pH = 7, using up 131 ml of this acid solution. The poly-(hydroxy carboxylate) solution obtained is evaporated to dryness, the residue is ground and is final dried once more as a powder for 3 hours in a water jet vacuum (14 mm Hg) at 120°C. The poly-(hydroxy carboxylate) is used in the G.F. test according to W. K. Fischer for the determination of the biological degradability. The BSBT-value (expressed in mg $O_2$/100 mg substratum) of the poly-(hydroxy carboxylate) was: 116.1.

In case of a substratum concentration of 2 ppm, an oxygen consumption of 1.11 ppm is measured with it in the G.F. test after 30 experimental days (starting with air-saturated water and at an innoculation with about 500 germs/cm³ of filtered activated sludge suspension from a community sewage plant), which corresponds to a biological degradation under G.F. test conditions of 48%.

c. With poly-(hydroxy carboxylate) produced under HCHO-condensation 400 ml of the above poly-(aldehydo carboxylic acid) solution are added to a 4 l three-necked flask. 50 ml of 40% formaldehyde solution are added. Then within 2 hours, 120 ml of 45% by weight of caustic soda solution (aqueous solution) are added while stirring and cooling the reaction mixture (water bath) slightly. The pH of the reaction mixture is continuously controlled electrometrically in the course of neutralization. After dosing-in this first NaOH charge, the reaction mixture has a pH of 7.0. Addition of another 45 ml of 45% by weight NaOH takes place within 1 hour, as a result of which the pH of the reaction mixture is raised to 12.5. This pH is maintained for 8 hours by continuous restoration of the caustic soda solution used up by the progressing Cannizzaro reaction. Altogether, 200 ml of 45% by weight of NaOH are consumed. Subsequently, neutralization is accomplished with a residue of not yet used poly-(aldehydo carboxylic acid) solution from the same polymerization preparation, to pH = 7. The poly-(hydroxy carboxylate) solution obtained is evaporated to dryness, the residue is ground and is final dried once more as a powder for 3 hours in a water jet vacuum (14 mm Hg) at 120°C. The poly-(hydroxy carboxylate) obtained is used in the G.F. test according to W. K. Fischer, for determination of the biodegradability. The BSBT-value (expressed in mg $O_2$/100 mg substratum) of the poly-(hydroxy carboxylate) was: 115.4.

In case of a substratum concentation of 2 ppm, an oxygen consumption of 1.13 ppm is measured with it in the G.F. test after 30 experimental days (starting with air-saturated water and with an innoculation with about 500 germs/cm³ of filtered activated sludge suspension from a community sewage plant), which corresponds to a biological degradation under G.F. test conditions of 49%.

EXAMPLE 5

A mixture of 400 ml distilled water and 900 ml 35% by weight of hydrogen peroxide are added to a 4 l three-necked flask with mechanical paddle, stirrer, reflux cooler, automatic temperature control by way of a resistance thermometer and a drop-in device taking 100 ml, and connected beside the introduction of the thermometer by way of a Claisen attachment. The resulting preparation is heated to 60°C with 25% by weight $H_2O_2$ while stirring in a water bath, controlled by thermostat at 60°C. Then the addition of a mixture of 780 ml freshly distilled acrolein and 198 ml stabilized (with 300 ppm hydroquinone) acrylic acid is started at an addition speed of about 245 ml per hour. Altogether, 1.5 hours after the beginning of the addition of monomer, the addition of n-dodecyl mercaptan to the reaction mixture is started, initially at a rate of 4% of the entire quantity of mercaptan to be added (i.e. 25.9 g = 30.7 ml) per hour. The addition rate of the mercaptan is increased gradually: 2 hours after the start of monomer addition it is 10% of the entire quantity of mercaptan to be added per hour, 3 hours after the beginning of monomer addition it is 14% per hour, 4 hours after the start of monomer addition 20 % per hour, 5 hours after the start of monomer addition 40% per hour, 6 hours after the start of monomer addition 100% of the n-dodecyl mercaptan had been added.

The thermostat-controlled water bath is maintained at 60°C during the entire reaction; the temperature of the reaction mixture rises in the course of the reaction to a maximum 77°C.

After 910 ml of monomer mixture have been added, it is diluted with 100 ml distilled water; likewise after 940 ml monomer mixture has been added and finally once more after the completion of monomer addition. After completion of addition of mercaptan, stirring the water bath controlled by thermostat at 60°C, continued for 3 hours, then the heating of the water bath is turned off and preparation is left to itself for 12 hours.

After that, 20 vol. % of the preparation is distilled off in a water jet vacuum after 400 ml isopropyl alcohol had been added. The residue represents an about 33% by weight aqueous solution of a poly-(aldehydo carboxylic acid) with a mean polymerization degree of 12 (eta red = 0.050 dl/g), a carbonyl content of 18.2 basic mole % and a carboxyl content of 78.3 basic mole %. [The remaining 3.5 basic mole % corresponds to vinyl groups from the units of the formula (III)].

Testing the Biological Degradability.

a. With poly-(aldehydo carboxylate)

700 ml of the above poly-(aldehydo carboxylic acid) solution are added to a 4 l three-necked flask. Within 2 hours, 170 ml of 45% by weight caustic soda solution (aqueous solution) are added in while stirring and cooling the reaction mixture (water bath) slightly. The pH of the reaction mixture is continuously controlled electrometrically in the course of neutralization. As soon as the reaction mixture has reached a pH value of 7, the addition of liquor is stopped. The poly-(aldehydo carboxylate) solution obtained is evaporated to dryness, the residue is ground and final dried once more as a powder for 3 hours at 120°C in a water jet vacuum (12 mm). The pure poly-(aldehydo carboxylate) obtained is used in the G.F. test according to W. K. Fischer for the determination of the biodegradability. The BSBT-value (= theoretical biochemical oxygen requirement for complete biological oxidation expressed in mg $O_2$/100 mg substratum) of the poly-(aldehydo carboxylate) was: 120.8.

In case of a substance concentration of 2 ppm, an oxygen consumption of 1.26 ppm is measured with this in the G.F. test after 30 experimental days (starting with airsaturated water and at an innoculation with about 500 germs/cm³ of filtered activated sludge suspension from a community sewage plant) which corresponds to a biodegradation rate under G.F. test conditions of 52%.

b. With poly-(hydroxy carboxylate)

700 ml of the above poly-(aldehydo carboxylic acid) solution are added to a 4 l three-necked flask. Within 2 hours, 170 ml of 45% by weight caustic soda solution (aqueous solution) are added while stirring and cooling the reaction mixture slightly. The pH of the reaction mixture is continuously controlled electrometrically in the course of the neutralization. After addition of the first NaOH charge, the reaction mixture has a pH of 7.0. Within 5 hours, another 45 ml of 45% by weight NaOH are added, as a result of which the pH of the reaction mixture rises to 12. This pH is maintained for 4 hours by continuous restoration of the caustic soda solution consumed by the progressive Cannizzaro reaction. Altogether, 230 ml 45% by weight NaOH is used up. Subsequently neutralization takes place with 20% sulfuric acid to pH = 7, consuming 53 ml of this acid solution.

The poly-(hydroxy carboxylate) solution obtained is evaporated to dryness, the residue is ground and once more final dried as a powder for 3 hours in a water jet vacuum (14 mm Hg) at 120°C. The poly-(hydroxy carboxylate) obtained is used in the G.F. test according to W. K. Fischer for the determination of the biodegradability. The BSBT-value (expressed in mg $O_2$/100 mg substratum) of the poly-(hydroxy carboxylate) was: 114.2.

In case of a substratum concentration of 2 ppm, an oxygen consumption of 1.14 ppm is measured with this after 30 days of experiments in the G.F. test (starting with air-saturated water and with an innoculation with about 500 germs per cm³ of filtered, activated sludge suspension from a community sewage plant), which corresponds to a biodegradation under G.F. test conditions of 50%.

While even this value of biodegradability in the G.F. test clearly is above the border value of 35–40%, so that therefore this poly-(hydroxy carboxylate) can be classified according to W. K. Fischer (Tenside Detergents loc. cit.) as "sufficient" to "well biodegradable," additionally the biological degradation behaviour of the same substance was examined in the official German test for detergents [AD test; according to W. Husmann, described in the "Decree Concerning Degradability of Detergents in Detergents and Cleaning Agents" of Dec. 1, 1962 Fed. Gazette (B. Ges. Bl.) 49, 1962, part 1, pp. 698–706]. Since the methylene blue method, suitable for anionic tensides is not suitable for the quantitative determination of POC concentrations, the CID values [those are the values of the "chemical-oxygen-demand" = milligram $O_2$], which are required for the chemical oxidation of the content substances-oxidizable according to the chromate-method ("Determination of oxidizability" according to H4 of the German uniform process for the examination of water, 5th edition, issue 1968, p. 6 ff) of 1 liter test solution, corresponding to the chromate-consumption, of the inflow and outflow solutions in case of the AD test are used as the measure for the total concentration of organic substances—and thus also of POC concentration.

Two experimental installations are operated in parallel, one of which (as a blank test) had been charged only with the synthetic sewage to be used according to the AD test regulation, while in the second installation the inflow of synthetic sewage was "stocked" with 50 ppm of the above described poly-(hydroxy carboxylate). After a working-in time of 14 days, the determination of the COD values of the unstocked inflow ($COD^{inflow}_{without\ POC}$), of the stocked inflow ($COD^{inflow}_{with\ POC}$), of the outflow from the installation operated without being stocked ($COD^{outflow}_{without\ POC}$), and of the outflow from the installation operated with POC-stock ($COD^{outflow}_{with\ POC}$), was carried on for 16 days. The COD values found for those 16 days of experimentation are listed in the following table:

$$\overline{COD}^{inflow}_{without\ POC} = 294.5 \qquad \overline{COD}^{inflow}_{with\ POC} = 338$$
$$\overline{COD}^{outflow}_{without\ POC} = 120 \qquad \overline{COD}^{outflow}_{with\ POC} = 126.1$$

According to the scheme developed by W. Janicke (Water Research, 1971, Vol 5, pp. 917–931) the following COD differential values result from that:

$$\overline{\Delta COD}^{inflow} = 43.5$$
$$\overline{\Delta COD}^{outflow} = 6.1$$

Thus, one will obtain as the percentual, biodegradability in the AD test:

$$\% \text{ Degrad.} = 100\ \frac{\overline{\Delta COD}^{inflow} - \overline{\Delta COD}^{outflow}}{\overline{\Delta COD}^{inflow}}$$
$$= 100\ \frac{43.5 - 6.1}{43.5} = 86\%$$

According to this the poly-(hydroxy carboxylate) is to be designated as "well biologically" degradable, in agreement with the G.F. test result.

As used herein, the expression "alkali metal hydroxide" refers to a hydroxide of an element from Group IA of the Periodic Table of the Elements. Preferred alkali metal hydroxides are sodium and potassium hydroxides.

In practicing this invention, the monomer or mixture of monomers and n-dodecyl mercaptan are slowly added to the reaction medium. It will be understood that these materials can be gradually added in a continuous manner over a period of time, or they can be dossed-in, such as in discrete portions, spaced over a similar period of time. The time periods can be ascertained with a minimum of experimentation taking into account the foregoing detailed description of this invention.

The aqueous, hydrogen peroxide reaction medium is "moving" during the polymerization. Means for accomplishing this are well known in the art. Agitation, for example, by auxiliary means such as stirring, can be employed.

What is claimed is:

1. In a process for the preparation of an improved biological degradable polycarboxylate by the oxidative polymerization of acrolein alone or with acrylic acid, said process comprising slowly adding acrolein monomer or acrolein-acrylic acid monomer mixture to a heated, moving aqueous hydrogen peroxide solution, the improvement comprising slowly adding to said peroxide solution about 0.1 to about 10% by weight of n-dodecyl mercaptan, related to the weight of monomer or monomer mixture, during polymerization.

2. Process according to claim 1 in which the addition of the n-dodecyl mercaptan is started and completed simultaneously with the addition of the monomer or monomer mixture.

3. Process according to claim 1 in which the addition of the n-dodecyl mercaptan begins about 0.1 to 2 hours after the beginning of the addition of the monomer or monomer mixture and ends up to about 3 hours after the completion of the addition of the monomer or monomer mixture.

4. Process according to claim 1 in which the rate of addition of the n-dodecyl mercaptan is increased during the course of its addition to the moving hydrogen peroxide solution.

5. Process according to claim 2 in which the rate of addition of the N-dodecyl mercaptan is increased during the course of its addition to the moving hydrogen peroxide solution.

6. Process according to claim 3 in which the rate of addition of the n-dodecyl mercaptan is increased during the course of its addition to the moving hydrogen peroxide solution.

7. Process according to claim 1 in which the monomer mixture comprises up to about 50 mole % acrylic acid.

8. Process according to claim 7 in which the monomer mixture comprises about 10 to about 30 mole % acrylic acid.

9. Process according to claim 1 in which the solution comprises about 15 to about 25% by weight hydrogen peroxide.

10. Process according to claim 1 in which the solution is heated at about 50° to about 100°C.

11. Process according to claim 1 in which the solution is heated at about 55° to about 85°C.

12. Process according to claim 1 in which the acrolein and hydrogen peroxide are present in an amount such that there are about 1.0 to 1.2 moles of acrolein per mole of hydrogen peroxide.

13. Process according to claim 1 in which the monomer or monomer mixture is added within a time of up to about 7 hours.

14. Process according to claim 1 in which the monomer or monomer mixture is added over a period of about 3 to about 5 hours.

15. Process according to claim 1 in which the n-dodecyl mercaptan is in an amount of about 0.5 to about 5% by weight.

16. Process according to claim 1 in which the n-dodecyl mercaptan is employed in an amount of about 0.5 to about 2% by weight.

17. Process according to claim 1 in which the resulting polymerizate is subsequently subjected to Cannizzaro reaction.

18. Process according to claim 17 in which the polymerizate is neutralized with an alkali metal hydroxide.

19. Process according to claim 1 in which the n-dodecyl mercaptan is added over a period of about 3 to about 5 hours.

20. Process according to claim 1 in which the addition of the n-dodecyl mercaptan begins about 0.5 to about 1.5 hours after the beginning of the addition of the monomer or monomer mixture.

21. Process according to claim 1 in which the addition of the n-dodecyl mercaptan is completed simultaneously with the addition of the monomer or monomer mixture or up to about 3 hours after the completion of the addition of the monomer or monomer mixture.

22. Process according to claim 21 in which the addition of the n-dodecyl mercaptan is completed within about 0.5 to about 1.5 hours after the completion of the addition of the monomer or monomer mixture.

23. Process according to claim 1 in which the rate of addition of the n-dodecyl mercaptan, expressed as % per hour of the total amount to be added, is about 1 to about 40% per hour.

24. Process according to claim 23 in which the rate of addition of the n-dodecyl mercaptan is about 1 to about 10% per hour.

25. Process according to claim 24 in which the rate of addition of the n-dodecyl mercaptan is initially about 1 to about 5% per hour, and the rate of addition is gradually increased so that after the 3rd hour after the beginning of the addition of the monomer or monomer mixture, up to about 30% of the total quantity of mercaptan to be added has been added.

26. Process according to claim 1 in which the monomer or monomer mixture contains up to about 500 ppm of a stabilizer which will retard spontaneous radical polymerization.

27. Process according to claim 26 in which the stabilizer is a hydroquinone or a hydroquinone ether.

28. Process according to claim 27 in which the stabilizer is hydroquinone monomethyl ether.

29. Process according to claim 1 in which a lower alcohol or silicone-based defoaming agent is employed during polymerization in order to decrease foaming.

30. Process according to claim 18 in which the alkali metal is sodium or potassium.

31. Process according to claim 1 in which, after at least about 80% of the monomer or monomer mixture has been added, water is added to the hydrogen peroxide solution in an amount sufficient to yield an about 20 to about 40% weight (aldehydo carboxylic acid) solution at the end of the polymerization reaction.

32. Process according to claim 1 in which the resulting polymerizate is subsequently subjected to Cannizzaro reaction in a dilute solution of the resulting polymerizate or a dilute alkali metal hydroxide solution or by a slow addition of alkali metal hydroxide to an agitated solution of the resulting polymerizate in order to avoid localized condensation to aldols.

33. Process according to claim 32 in which Cannizzaro reaction is carried out in the presence of formaldehyde.

34. Process according to claim 1 in which, after completion of the additon of the monomers, the aqueous solution is stirred for up to about 12 hours at about 40° to about 90°C.

35. Process according to claim 34 in which said stirring is conducted at about 50° to about 75°C after completion of the addition of the monomers.

36. Process according to claim 1 in which unreacted monomers are removed from the solution by distillation or film evaporation.

37. Process according to claim 36 in which distillation is conducted at reduced pressure and about 10 to about 40% by volume of the solution is removed.

* * * * *